(12) United States Patent
Kawai

(10) Patent No.: US 6,671,081 B2
(45) Date of Patent: Dec. 30, 2003

(54) ELECTROPHORETIC DEVICE, METHOD FOR DRIVING ELECTROPHORETIC DEVICE, CIRCUIT FOR DRIVING ELECTROPHORETIC DEVICE, AND ELECTRONIC DEVICE

(75) Inventor: Hideyuki Kawai, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/224,543

(22) Filed: Aug. 20, 2002

(65) Prior Publication Data

US 2003/0067666 A1 Apr. 10, 2003

(30) Foreign Application Priority Data

Aug. 20, 2001 (JP) .................. 2001-249560
Jul. 29, 2002 (JP) .................. 2002-220396

(51) Int. Cl.⁷ .................................. G02B 26/00
(52) U.S. Cl. ........................... 359/296; 430/35
(58) Field of Search ......................... 359/296, 253, 359/452; 345/107, 105; 430/35; 204/622

(56) References Cited

FOREIGN PATENT DOCUMENTS

JP 05-061421 3/1993

*Primary Examiner*—Scott J. Sugarman
*Assistant Examiner*—Richard Hanig
(74) *Attorney, Agent, or Firm*—Harness, Dickey & Pierce, P.L.C.

(57) ABSTRACT

An electrophoretic display device 20A includes a first substrate 1 having a first electrode 3, a second substrate 2 having a transparent electrode 4, and a electrophoretic dispersion liquid 10 filled in the space between the electrodes 3 and 4, wherein at least one of the electrodes 3 and 4 has an insulating film 11 thereon. A drive voltage generator 30 generates a drive voltage applied between the electrodes 3 and 4, and the waveform of the generated drive voltage changes with a time constant larger than the time constant of the insulating film 11 after the voltage is interrupted.

13 Claims, 13 Drawing Sheets

(b)

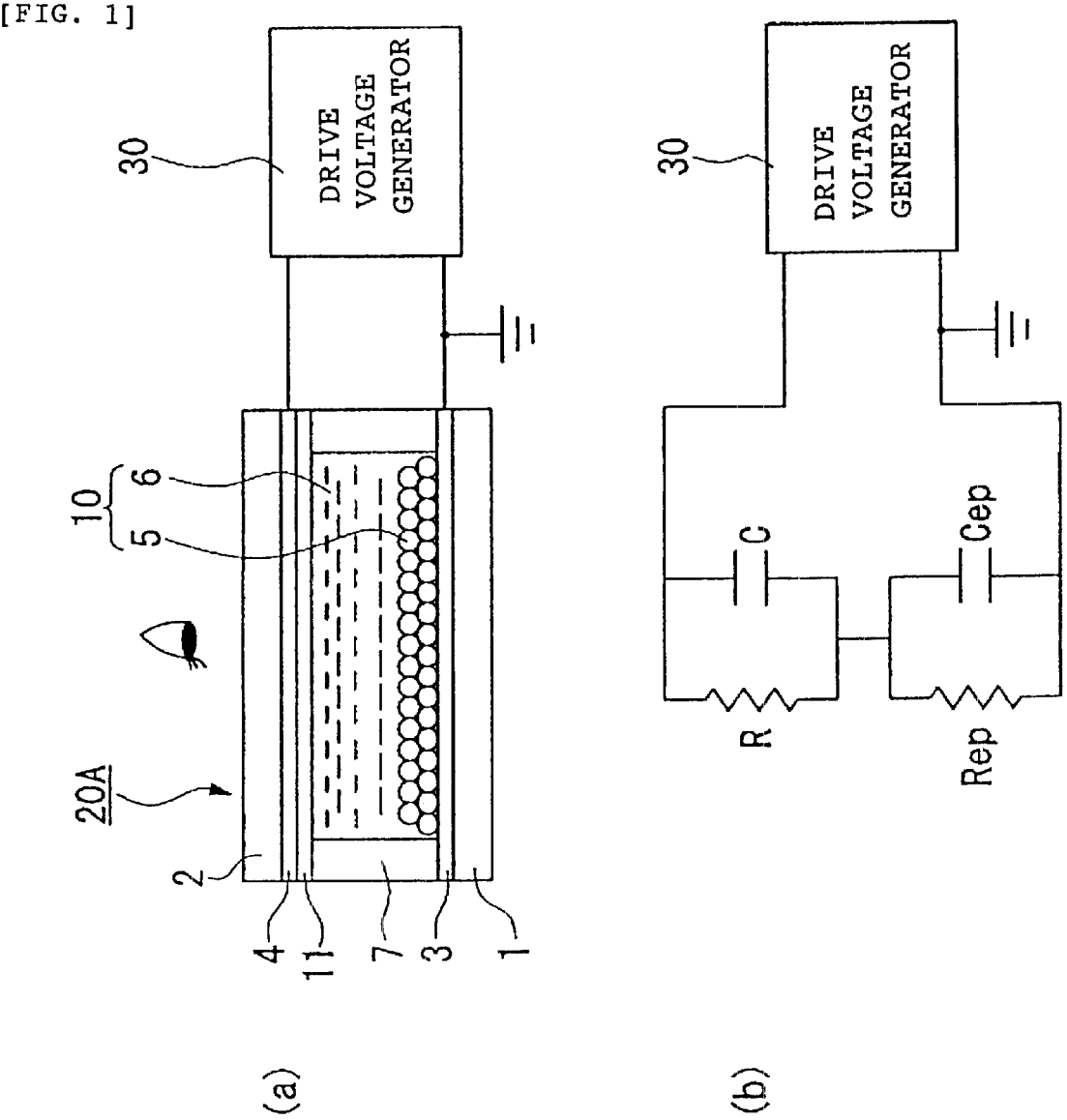
[FIG. 1]

[FIG. 2]
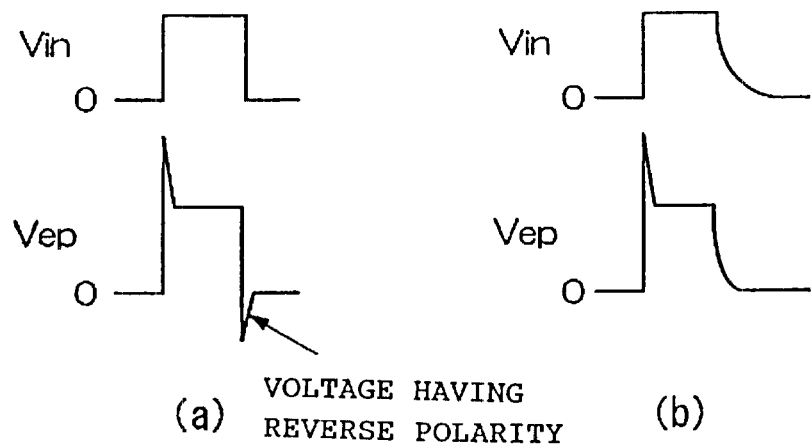
(a) VOLTAGE HAVING REVERSE POLARITY   (b)
[FIG. 3]
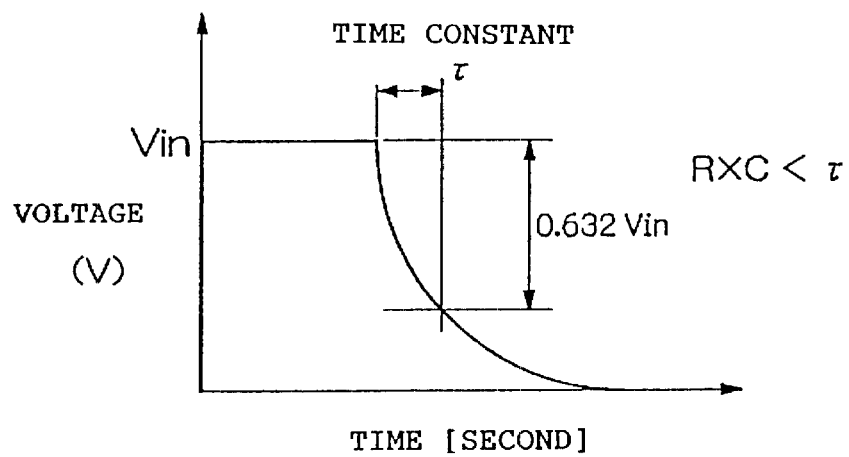
[FIG. 4]
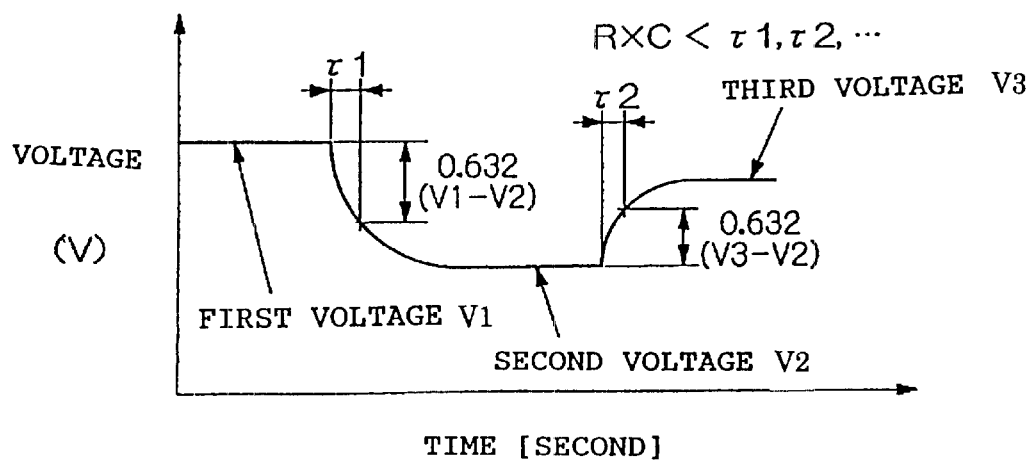

[FIG. 5]
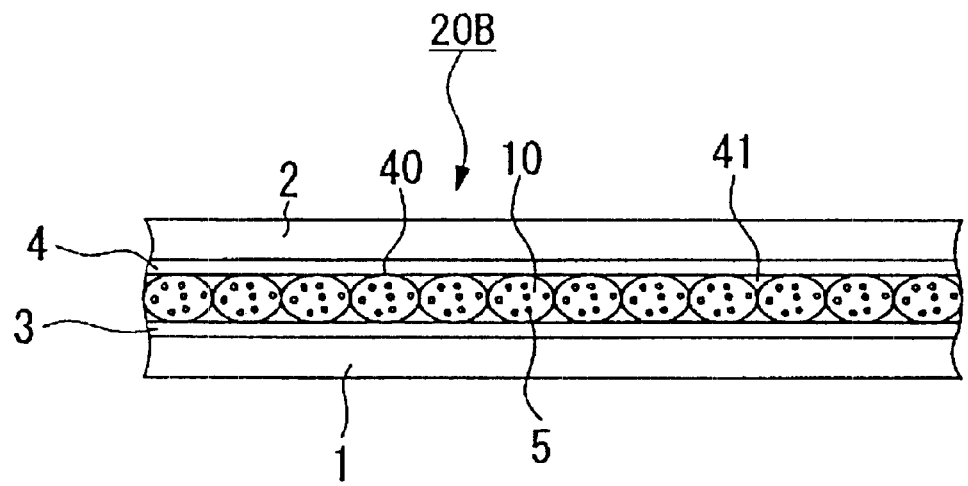
[FIG. 6]
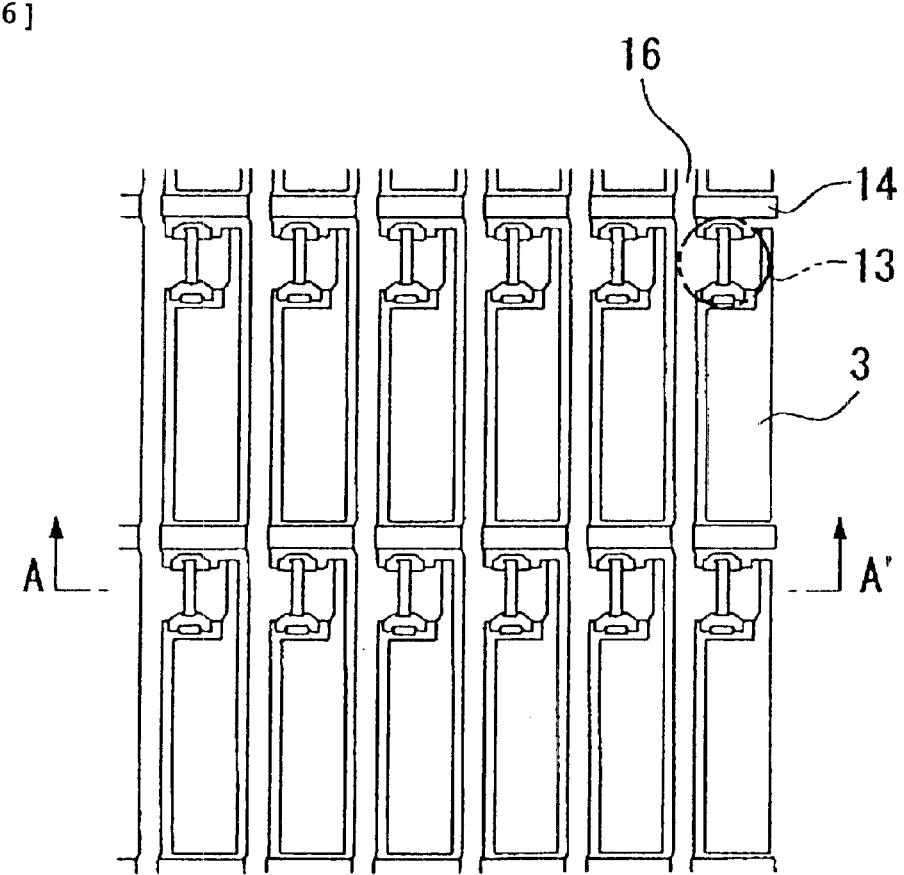

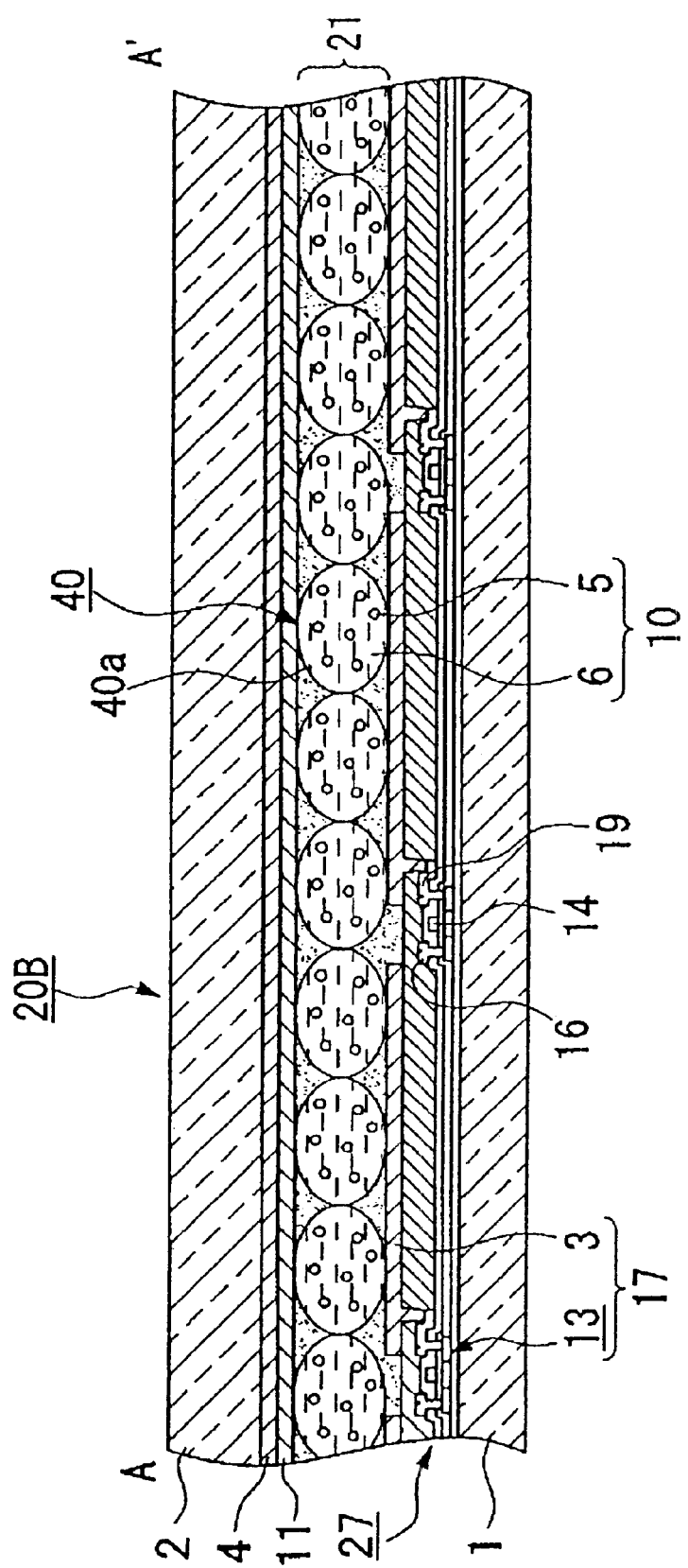
[FIG. 7]

[FIG. 8]
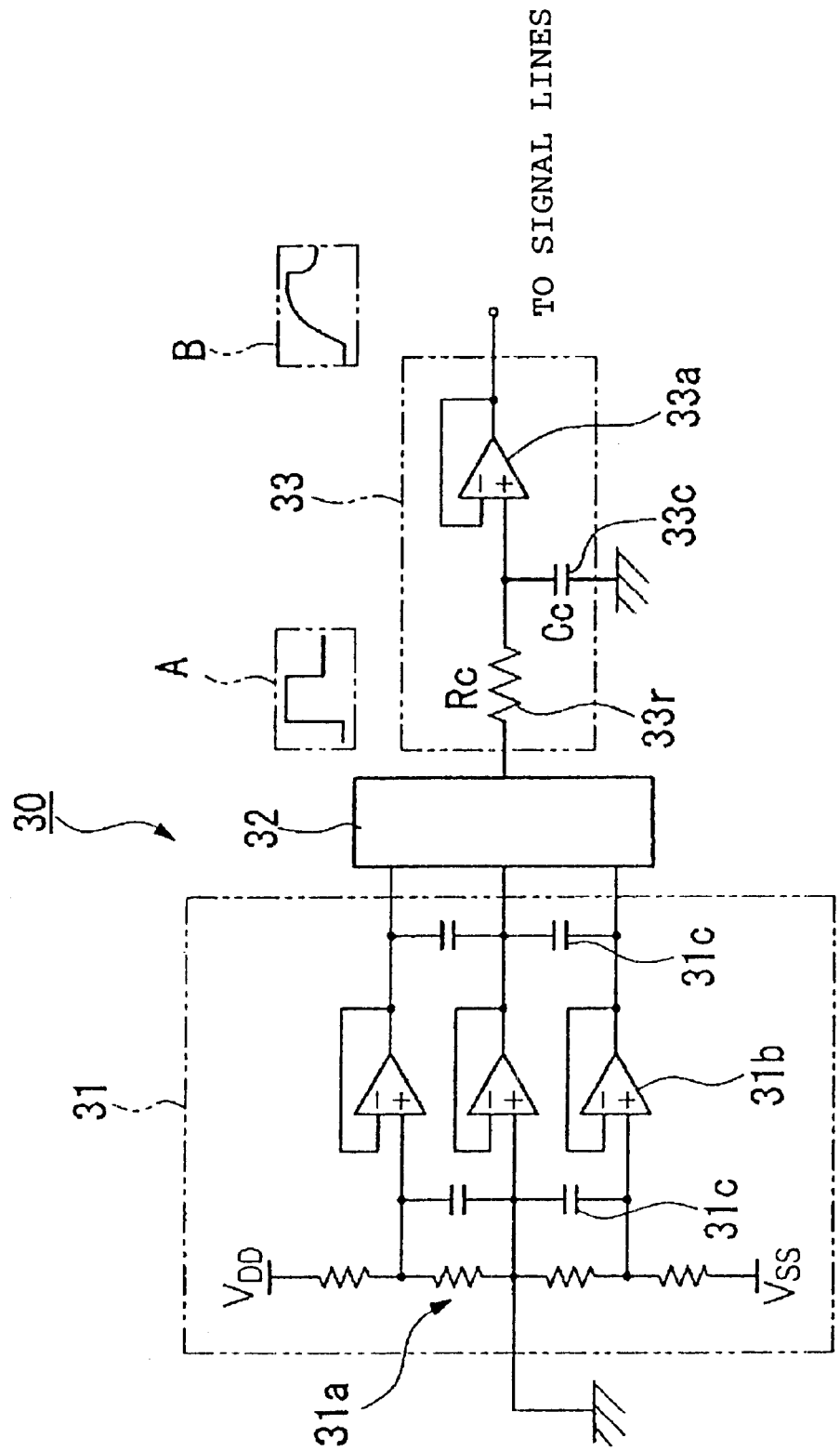

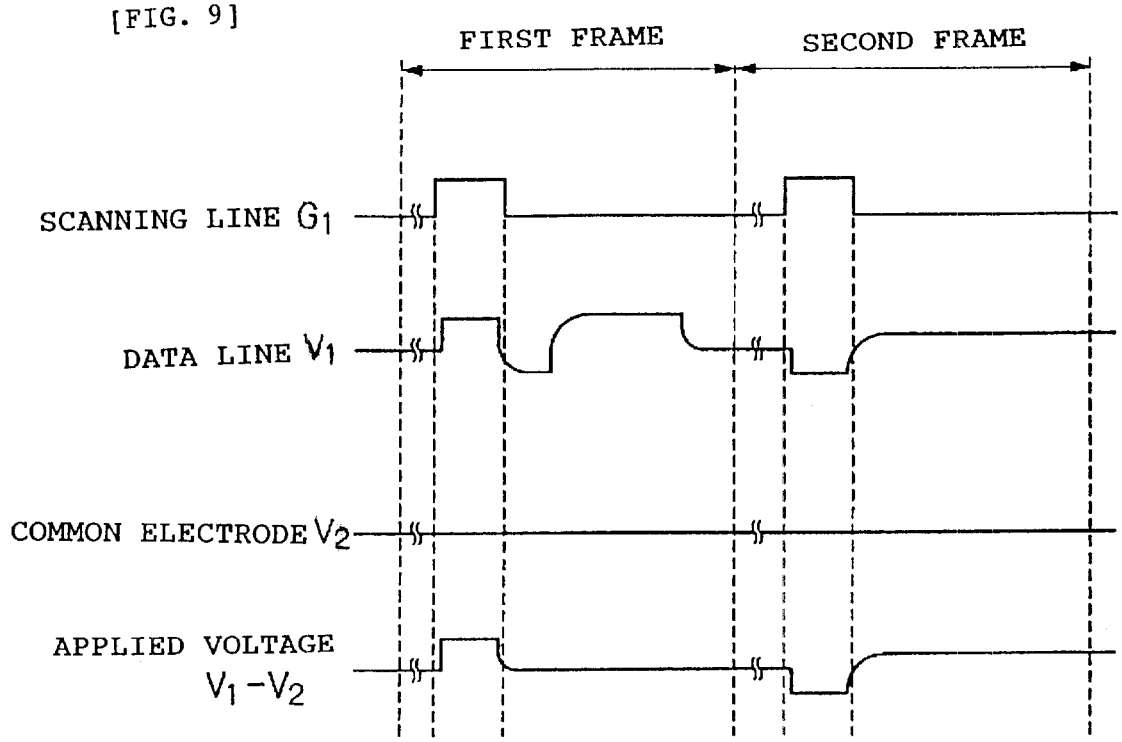

[FIG. 10]
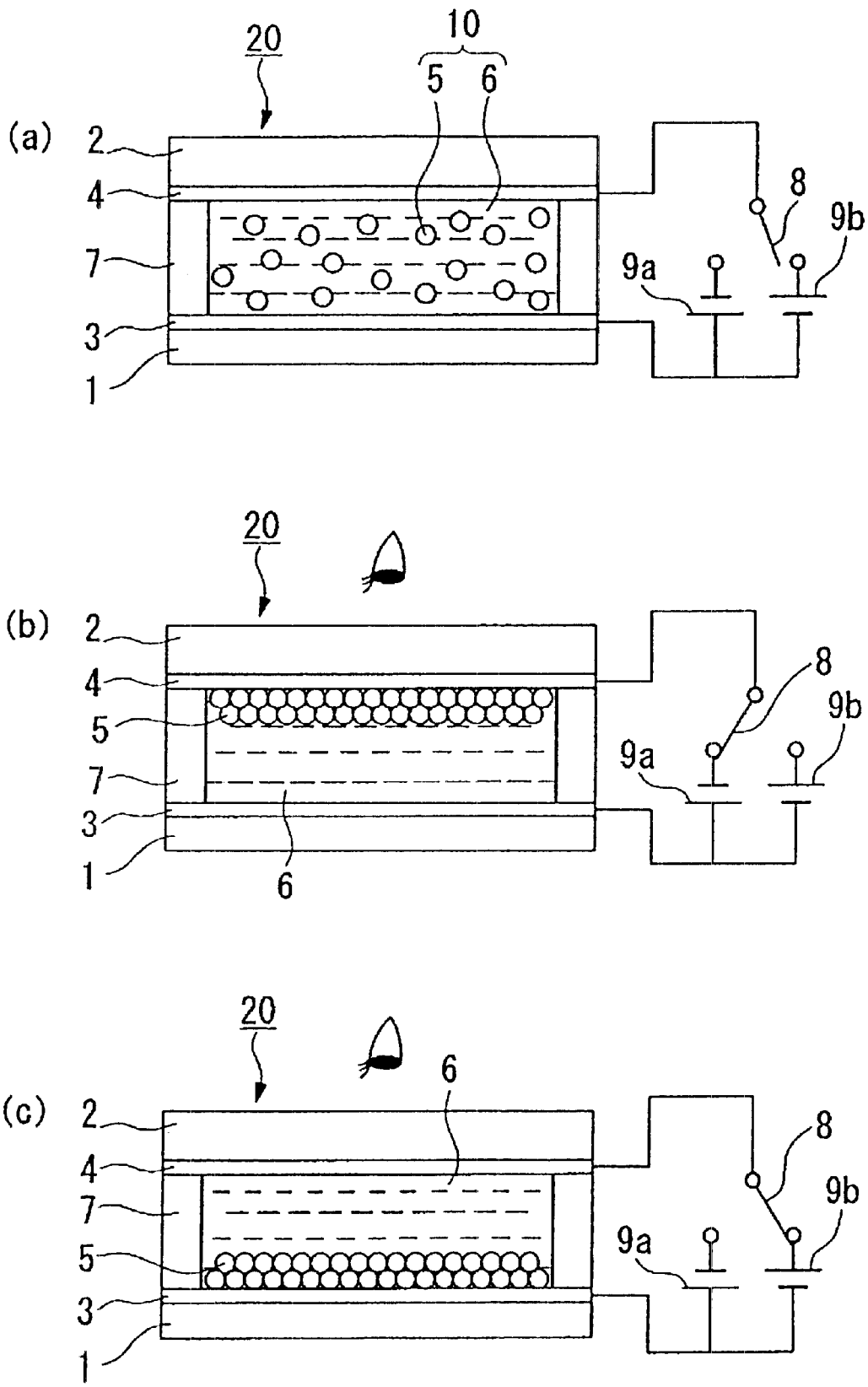

[FIG. 11]
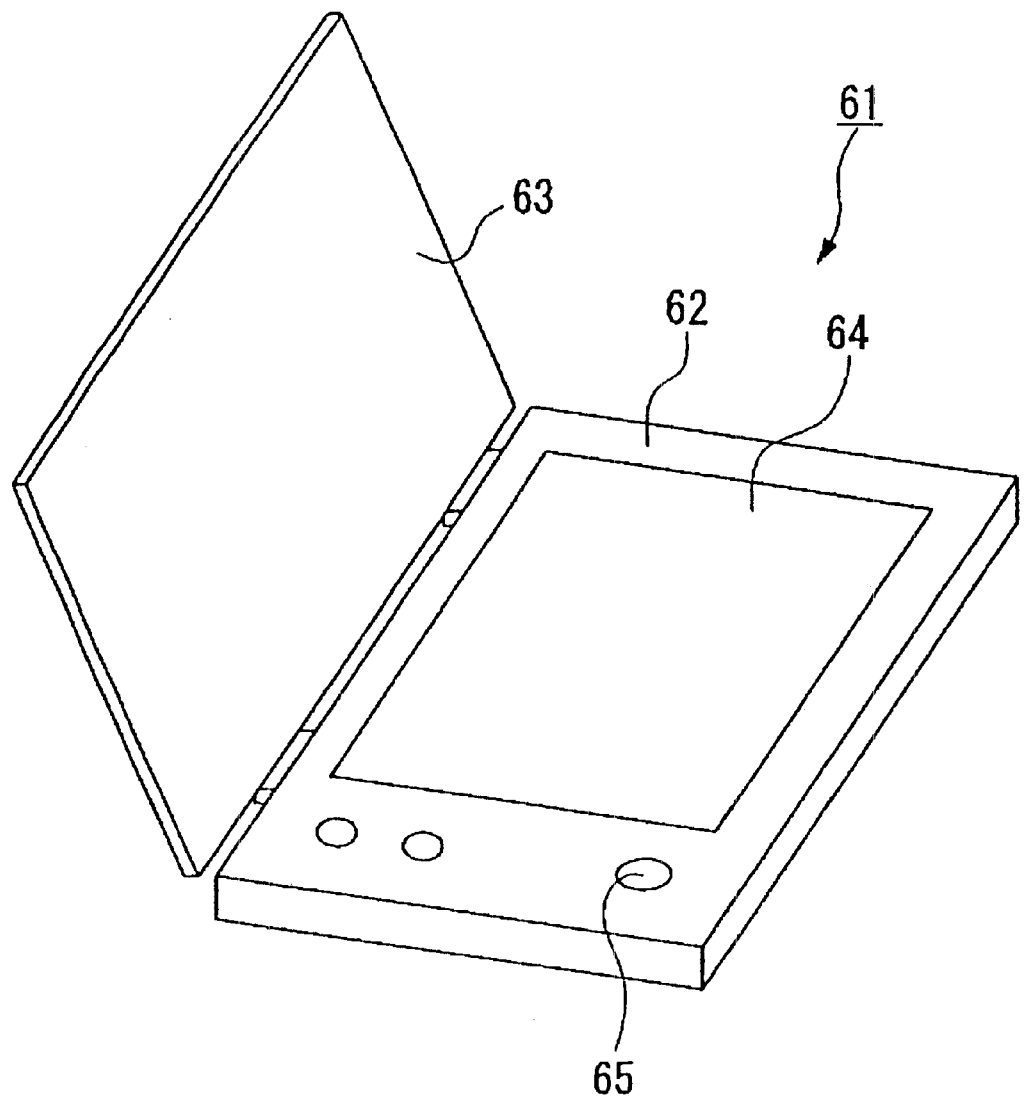

[FIG. 12]
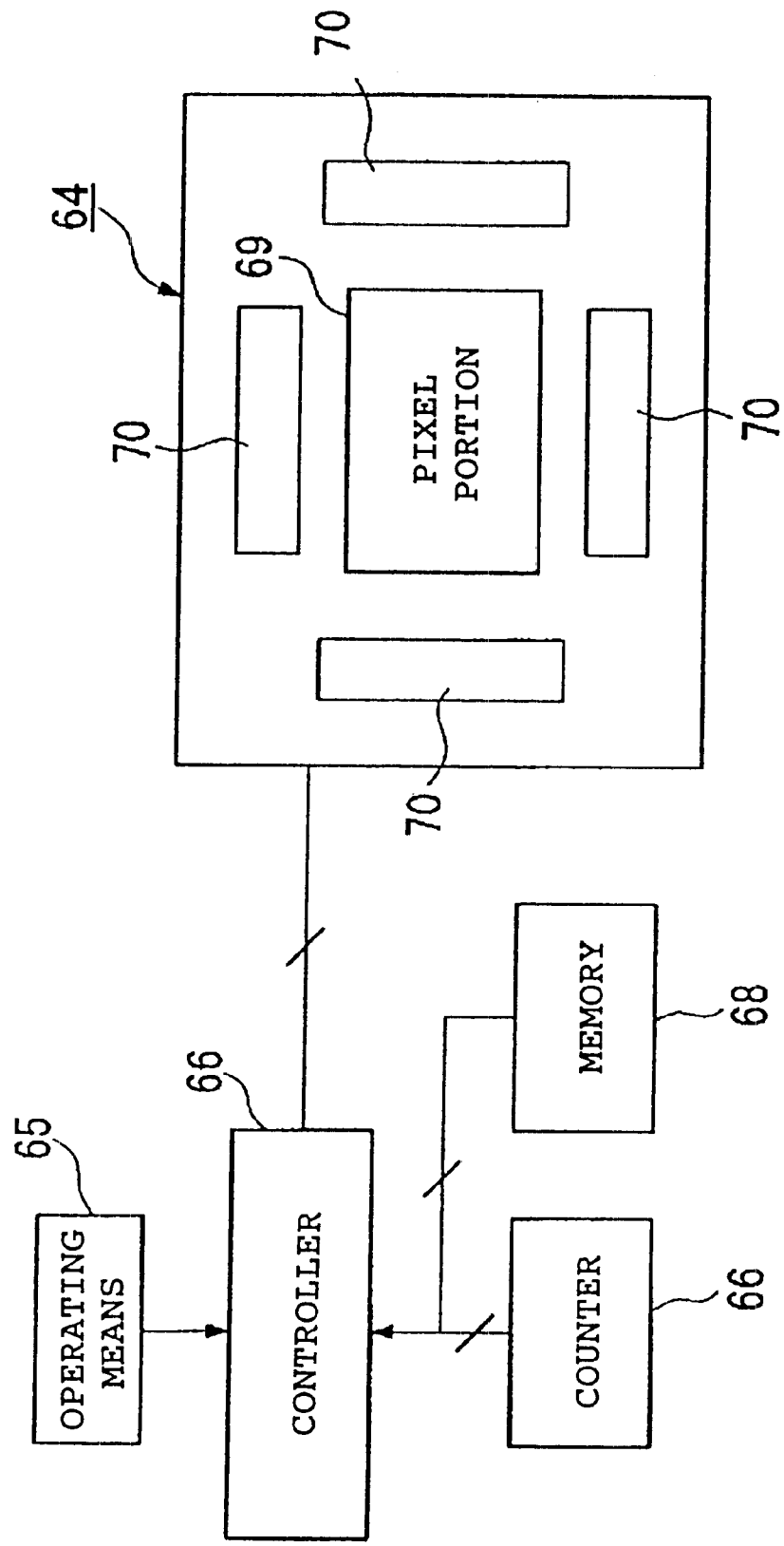

[FIG. 13]
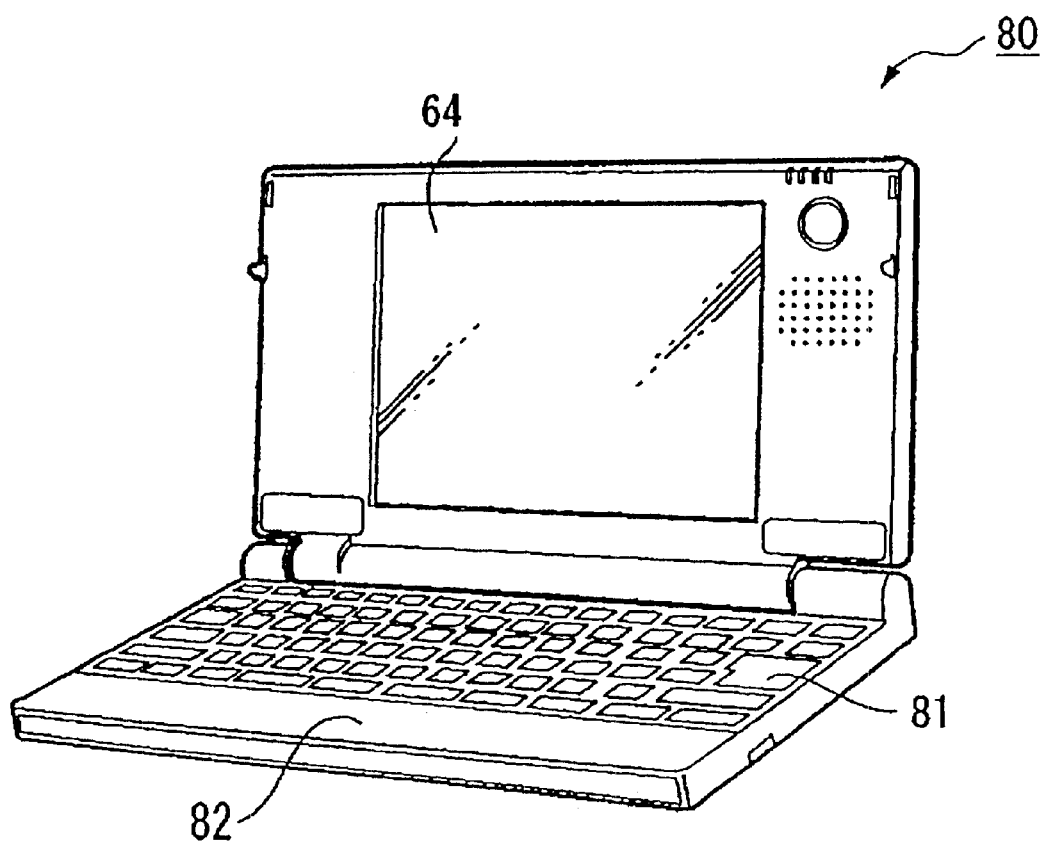

[FIG. 14]
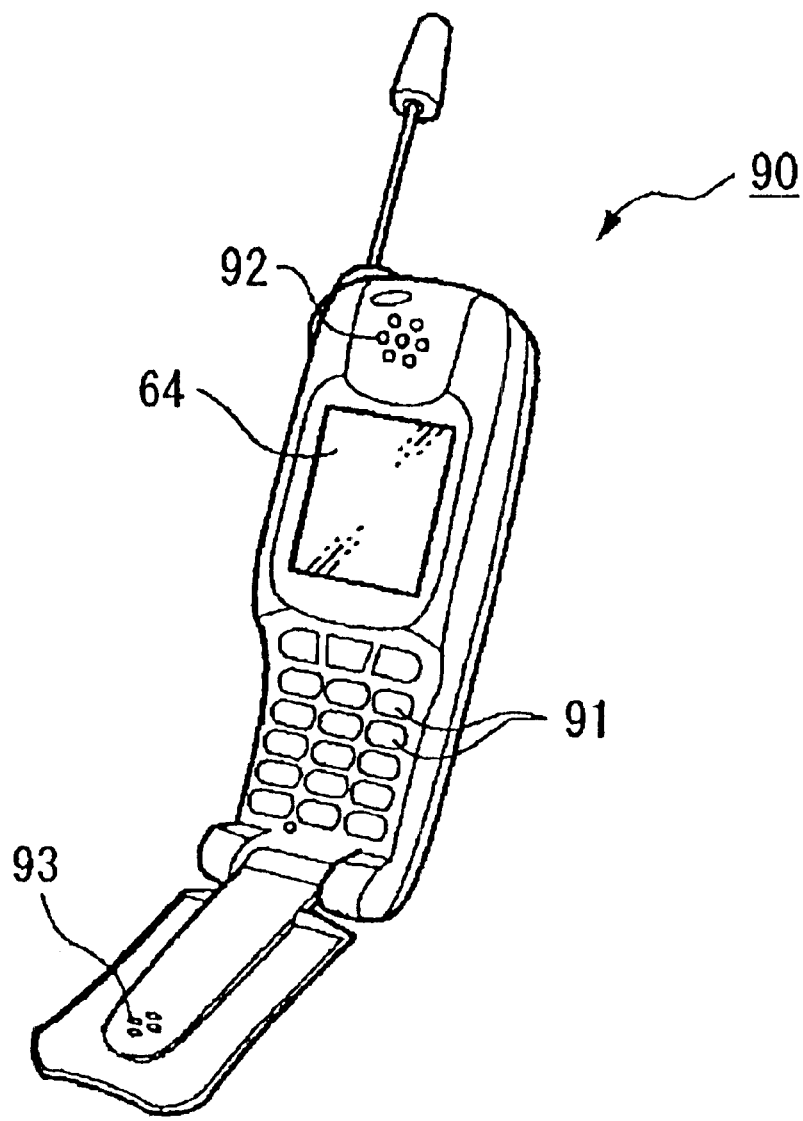

[FIG. 15]
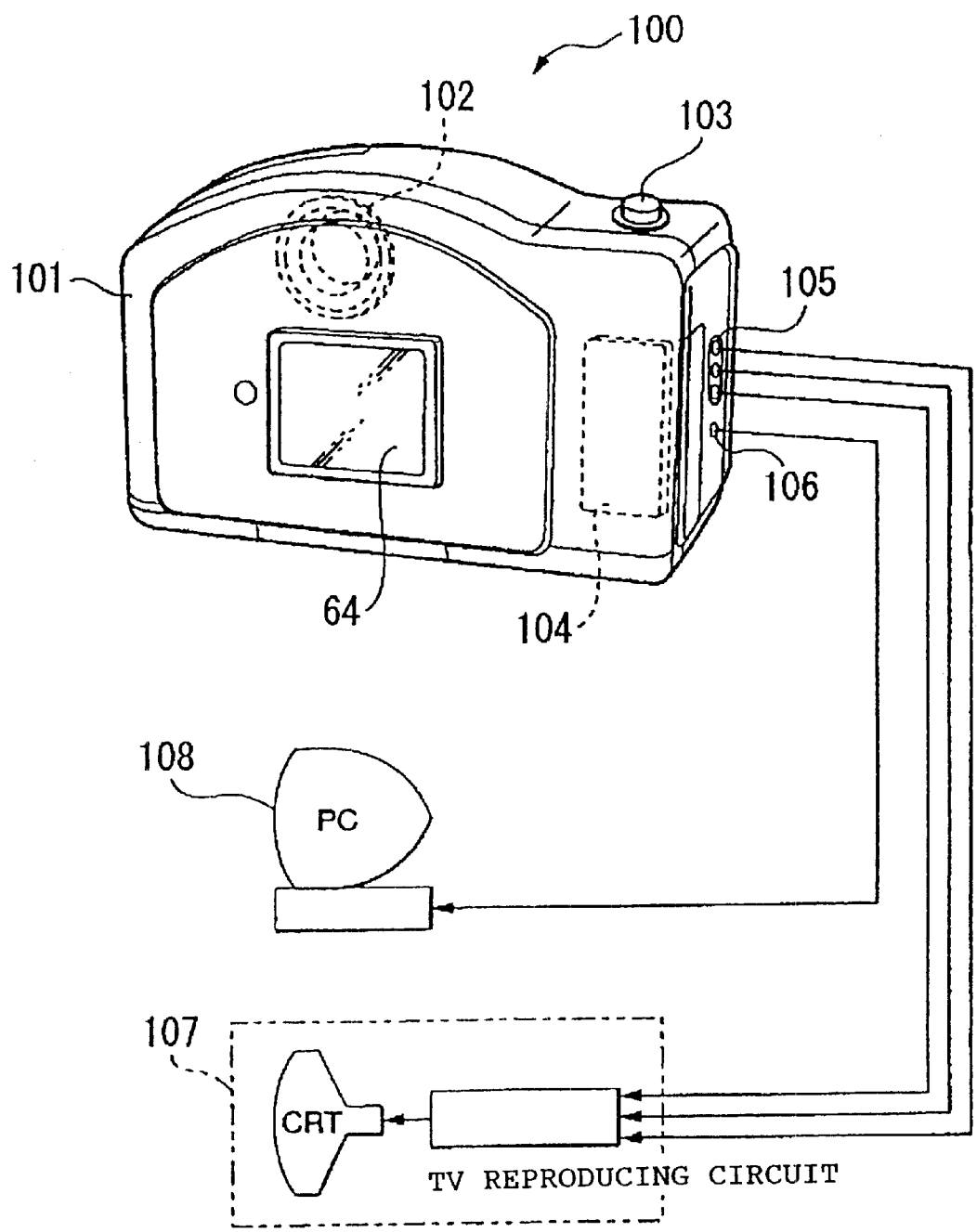

[FIG. 16]
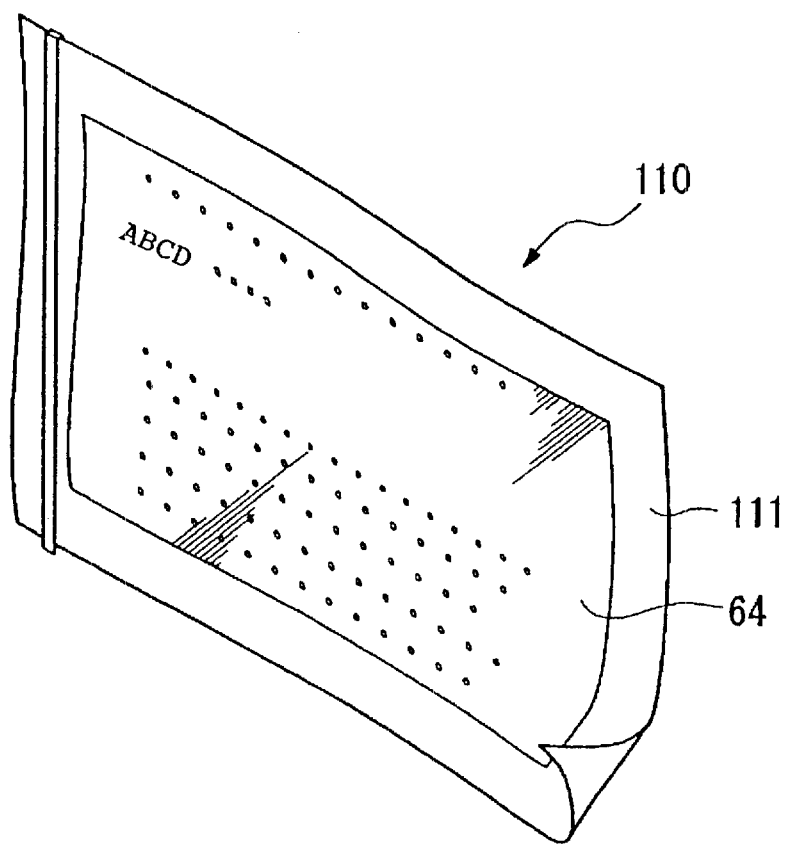
[FIG. 17]
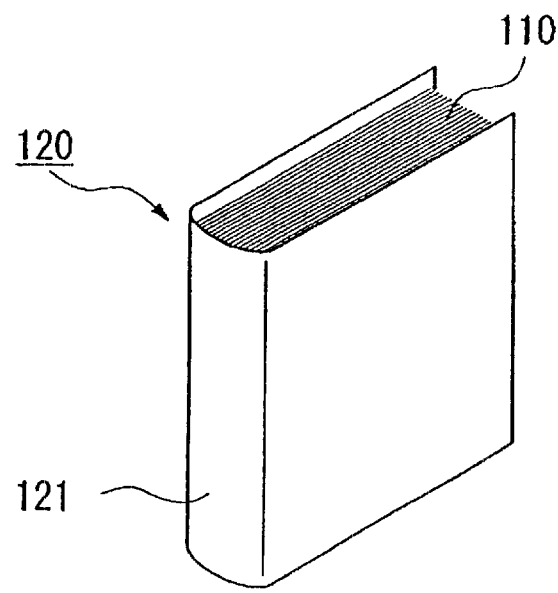

ELECTROPHORETIC DEVICE, METHOD FOR DRIVING ELECTROPHORETIC DEVICE, CIRCUIT FOR DRIVING ELECTROPHORETIC DEVICE, AND ELECTRONIC DEVICE

BACKGROUND OF THE INVENTION

1. Technical Field of the Invention

The present invention relates to electrophoretic devices, and particularly relates to an electrophoretic device having opposing electrodes, members comprising an insulating material, and an electrophoretic dispersion liquid containing a liquid dispersion medium and electrophoretic particles, wherein the members and the dispersion liquid are placed between the opposing electrodes.

Furthermore, the present invention relates to various electronic devices including an electrophoretic display device having an electrophoretic device.

2. Description of the Related Art

Conventionally, among electrophoretic devices having a pair of electrodes between which an electrophoretic dispersion liquid containing a liquid dispersion medium and electrophoretic particles are located, the following device is known: an electrophoretic device utilizing a phenomenon wherein the distribution of the electrophoretic particles is changed by applying a voltage between a pair of the electrodes. FIG. 10(a) is a general structural illustration showing an electrophoretic display device including the electrophoretic device.

The electrophoretic display device 20 includes a first substrate 1 having an electrode 3, a second substrate 2 having a transparent electrode 4, an electrophoretic dispersion liquid 10 packed into a space between the electrode 3 and the transparent electrode 4, and a spacer 7 having a function of preventing the electrophoretic dispersion liquid 10 from leaking out. FIG. 10(a) is a sectional view showing one pixel in a display.

The electrophoretic dispersion liquid 10 contains a liquid dispersion medium 6 and electrophoretic particles 5 dispersed in the liquid dispersion medium 6. The liquid dispersion medium 6 has a color different from that of the electrophoretic particles 5.

The electrophoretic display device 20 is connected to power supplies 9a and 9b for applying voltages in opposite directions through a selector switch 8. That is, the electrode 3 is connected to one end of the power supplies 9a and 9b, and the electrode 4 is connected to the other end of the power supplies 9a and 9b through the selector switch 8. In such a configuration, the direction of a voltage applied between the electrodes 3 and 4 can be changed by switching the selector switch 8. Changing the direction of the applied voltage causes the electrophoretic particles to gather at a desired electrode, thereby performing desired display.

Referring to FIG. 10(b), when the electrophoretic particles 5 are positively charged, applying a voltage from the power supply 9a causes the electrophoretic particles 5 to gather at the side of the transparent electrode 4, which is close to the observer. In this situation, the observer sees the color of the electrophoretic particles 5. In contrast, as shown in FIG. 10(c), applying a voltage from the power supply 9b causes the electrophoretic particles 5 to gather at the side of the electrode 3, which is away from the observer. In this situation, the observer sees the color of the liquid dispersion medium 6. When the electrophoretic particles 5 are negatively charged, the particles migrate in the opposite direction to that in the above description.

As described above, when the configuration shown in FIG. 10(a) is employed, two-color display is possible depending on the direction of an applied voltage. Therefore, electrophoretic displays for displaying desired images can be obtained by applying the configuration shown in the figure to all pixels.

Furthermore, other electrophoretic devices having electrodes covered with an insulating material are known. In the electrophoretic devices, an insulating layer is disposed on a surface of at least one of the mutually opposing electrodes and the maximum voltage applied to the insulating layer is designed to be smaller than the product of the dielectric breakdown strength and the thickness of the insulating layer. In such a configuration, the electrophoretic dispersion liquid can be prevented from deteriorating due to carrier transfer between the electrophoretic dispersion and the electrodes.

It is expected that electronic paper can be achieved by providing the above electrophoretic devices on a flexible substrate. In such electronic paper, it is necessary to hold the display content for a long time after the display content is written by applying a voltage.

In an electrophoretic device including electrodes provided with an insulating film thereon, when the time constant of the insulating film is adjusted to be larger than the time constant of the electrophoretic dispersion, holding the display content for a long time is impossible due to self-deletion.

When the time constant of the insulating film is reduced, self-deletion can be prevented. However, it is difficult to apply an electrical field having intensity sufficient to cause the electrophoretic particles to migrate in the electrophoretic dispersion liquid. Furthermore, there is a risk that the insulating performance of the insulating film will degrade, deteriorating the electrophoretic dispersion.

The present invention has been developed in order to solve the above disadvantages of conventional methods, and it is a first object of the present invention to provide an electrophoretic device in which the electrophoretic dispersion liquid is prevented from deteriorating and the image-retention characteristics are greatly improved to obtain, for example, electronic paper.

Furthermore, it is a second object to provide an electronic device including a display such as electronic paper, wherein the display is an electrophoretic display device and has greatly improved image-retention properties.

SUMMARY OF THE INVENTION

In order to solve the above problems and to achieve the first object, an electrophoretic device of the present invention includes a first substrate, a first electrode disposed on the first substrate, a second substrate, a second electrode disposed on the second substrate and facing the first electrode, an electro-optical layer having an electrophoretic dispersion liquid containing at least a dispersion medium and electrophoretic particles and located between the first and second electrodes, and an insulating member disposed between the first and second electrodes, wherein a voltage applied between the first and second electrodes has different values, and the time constant of the voltage is larger than the time constant of the insulating member when the voltage changes from one of the different values to another.

According to the above configuration, when the time constant of the insulating member is larger than that of the electrophoretic dispersion liquid, self-deletion can be prevented, thereby significantly improving the image-retention characteristics.

In the electrophoretic device of the present invention, the insulating member may be disposed at least either between the first electrode and the electro-optical layer or between the second electrode and the electro-optical layer. The first substrate and the first electrode may both have optical transparency, and the insulating member may be disposed between the first electrode and the electro-optical layer and may have optical transparency.

The following relationship is preferably satisfied:

$$R \times C \geq Rep \times Cep$$

wherein R represents the electrical resistance of the insulating member, C represents the capacitance of the insulating member, Rep represents the electrical resistance of the electrophoretic dispersion liquid, and Cep represents the capacitance of the electrophoretic dispersion liquid.

According to this configuration, a high voltage can be applied to the electrophoretic dispersion liquid effectively.

The insulating member may include an insulating film disposed on at least one of the first substrate and the second substrate.

According to this configuration, the resistance and the capacitance can be adjusted by setting the type and the thickness of the insulating film so as to satisfy the above condition.

When the electro-optical layer includes a plurality of capsules containing the electrophoretic dispersion liquid, the insulating member may include the wall film of the capsules. Furthermore, when the electro-optical layer further includes a binder disposed at least either between the first electrode and the capsules or between the second electrode and the capsules, the insulating member may include the binder.

In the above configuration, since the electrophoretic particles are limited to migrate in one capsule, the distribution of the electrophoretic particles is uniform in the electro-optical layer, thereby achieving an electrophoretic device having high reliability. In this configuration, the wall film of each capsule or the binder functions as the insulating member according to the present invention.

The waveform of a voltage applied between the first electrode and the second electrode preferably changes with a time constant larger than the time constant of the insulating member after the voltage is interrupted.

According to this configuration, the waveform of the drive voltage can be freely set when the voltage is supplied, that is, the voltage waveform can be determined in order to achieve a good display response.

In an electrophoretic device according to the present invention having a first electrode, a second electrode facing the first electrode, an electro-optical layer having an electrophoretic dispersion liquid containing at least a dispersion medium and electrophoretic particles and located between the first and second electrodes, and an insulating member disposed between the first and second electrodes, a method for driving the electrophoretic device includes applying a signal voltage between the first and second electrodes, wherein the signal voltage has different values and has a smooth waveform when the signal voltage changes from one of the different values to another.

In the method for driving an electrophoretic device according to the present invention, a signal voltage having a smooth waveform is applied between the first and second electrodes when the signal voltage changes from one of the different values to another. Therefore, the application of a reverse-polarity voltage to the electrophoretic dispersion liquid can be prevented, thereby improving the image-retention characteristics.

In the method for driving an electrophoretic device according to the present invention, the time constant of the signal voltage is preferably larger than the time constant of the insulating member when the signal voltage changes from one of the different values to another. The waveform of the voltage applied between the first and second electrodes is preferably smoothed with a time constant larger than the time constant of the insulating member after the voltage is interrupted. The operation and the advantages are the same as those described above.

In an electrophoretic device according to the present invention having a first electrode, a second electrode facing the first electrode, an electro-optical layer having an electrophoretic dispersion liquid containing at least a dispersion medium and electrophoretic particles and located between the first and second electrodes, and an insulating member disposed between the first and second electrodes, a circuit for driving the electrophoretic device includes a voltage-generating circuit for generating a signal voltage having a plurality of different values, a selection circuit for selecting any one of the different values of the signal voltage generated in the voltage-generating circuit, and a waveform-shaping circuit for smoothing the waveform of a signal voltage output from the selection circuit when the signal voltage is changing.

According to the circuit for driving an electrophoretic device according to the present invention, a signal voltage having a smooth waveform can be supplied to either the first substrate 1 or the second substrate 2 when the signal voltage changes from one of the different values to another. Therefore, the application of a reverse-polarity voltage to the electrophoretic dispersion liquid can be prevented, thereby improving the image-retention characteristics.

In order to achieve the second object described above, the electronic device according to the present invention has a display for displaying data, wherein the display includes an electrophoretic display device having an electrophoretic device of the present invention.

According to such a configuration, even if the display is of the electrophoretic type, an electronic device including a display having greatly improved image-retention characteristics can be obtained.

BRIEF DESCRIPTION OF THE DRAWINGS

FIG. 1 is an illustration showing an electrophoretic device according to a first embodiment of the present invention, wherein FIG. 1(a) is a sectional view showing the configuration and FIG. 1(b) is an illustration showing an electrically equivalent circuit.

FIG. 2 is a view illustrating the operation of the present invention, wherein FIG. 2(a) illustrates the operation of a conventional device, and FIG. 2(b) illustrates the operation of a device according to the present invention.

FIG. 3 is an illustration showing the waveform of an applied voltage.

FIG. 4 is an illustration showing another example of the waveform of the applied voltage.

FIG. 5 is a sectional view showing the structure of an electrophoretic device according to a second embodiment of the present invention.

FIG. 6 is a plan view showing the electrophoretic device according to the second embodiment of the present invention.

FIG. 7 is a sectional view showing the structure taken along the line A–A' of FIG. 6.

FIG. 8 is a schematic circuit diagram showing the configuration of a drive voltage generator of the electrophoretic device according to the second embodiment of the present invention.

FIG. 9 is a timing chart illustrating the operation of the electrophoretic device according to the second embodiment of the present invention.

FIG. 10 is an illustration showing an example of a conventional electrophoretic device, wherein FIG. 10(a) is a plan view showing the structure thereof, and FIGS. 10(b) and 10(c) are views illustrating the image display principle.

FIG. 11 is a perspective view showing the external configuration of an electronic book, which is an example of an electronic device of the present invention.

FIG. 12 is a block diagram showing the electrical configuration of the electronic book.

FIG. 13 is a perspective view showing the external configuration of a computer, which is an example of an electronic device of the present invention.

FIG. 14 is a perspective view showing the external configuration of a mobile phone, which is an example of an electronic device of the present invention.

FIG. 15 is a perspective view showing the external configuration of a digital still camera, which is an example of an electronic device of the present invention.

FIG. 16 is a perspective view showing the external configuration of electronic paper, which is an example of an electronic device of the present invention.

FIG. 17 is a perspective view showing the external configuration of an electronic notebook, which is an example of an electronic device of the present invention.

DETAILED DESCRIPTION OF THE PREFERRED EMBODIMENTS

Embodiments of the present invention will be further described with reference to the drawings. In the drawings referred to in the following description, the same portions as those in other drawings shall have the same reference numerals.

First Embodiment

FIG. 1(a) is a sectional view showing the configuration of a first embodiment in which an electrophoretic display device includes an electrophoretic device according to the present invention.

As shown in FIG. 1(a), an electrophoretic display device 20A according to the first embodiment of the present invention has a first substrate 1, a second substrate 2, and a spacer 7 arranged around the periphery of the first substrate 1 and the second substrate 2 in order to maintain a predetermined distance between the first substrate 1 and the second substrate 2. The second substrate 2 includes, for example, a light transmissive plate such as transparent glass or a transparent film. A transparent electrode 4 formed by film deposition is disposed on a surface of the second substrate 2 facing the first substrate 1. The transparent electrode 4 includes, for example, an indium tin oxide film (ITO film) or the like.

The first substrate 1, which may not necessarily be transparent, includes, for example, a glass substrate or a film substrate. An electrode 3 is disposed on a surface of the first substrate 1 facing the second substrate 2. The electrode 3, which may not necessarily be transparent, includes, for example, an ITO film.

The spacer 7 also has the function of sealing a sealed space formed by the first substrate 1, the second substrate 2, and the spacer 7, and includes, for example, a sealing material such as an epoxy resin. The thickness of the spacer 7, that is, the interelectrode distance, is usually about 20 $\mu$m to 1 mm.

An insulating film 11 is disposed on a surface of at least one of the transparent electrode 4 and the electrode 3. The figure shows a configuration in which the insulating film 11 is disposed on a surface the electrode 3. When the insulating film 11 is placed on the transparent electrode 4, the insulating material used for the insulating film 11 must be transparent.

The insulating film 11 may comprise an insulating polymer such as polyethylene, polycarbonate, polyimide, a vinyl chloride resin, an acrylic ester copolymer, an epoxy resin, polyvinyl alcohol, a urethane resin, a phenol resin, gelatin, gum arabic, a polyamide resin, a urea-formaldehyde resin, a urea resin, and a silicone resin; an insulating metal oxide such as aluminum oxide, silicon oxide, barium titanate, and titanium oxide; a sulfide; or a halide.

The sealed space formed by the first and second substrates 1 and 2 and the spacer 7 is filled with an electrophoretic dispersion liquid 10 containing a liquid dispersion medium 6 and electrophoretic particles 5, which are dispersed in the dispersion medium and are electrically charged.

The liquid dispersion medium 6 includes water; alcohol solvents such as methanol, ethanol, isopropanol, butanol, octanol, and methyl cellosolve; various esters such as ethyl acetate and butyl acetate, ketones such as acetone, methyl ethyl ketone, and methyl isobutyl ketone; aliphatic hydrocarbons such as pentane, hexane, and octane; alicyclic hydrocarbons such as cyclohexane and methyl cyclohexane; aromatic hydrocarbons including long-chain alkylbenzenes such as benzene, toluene, xylene, hexylbenzene, heptylbenzene, octylbenzene, nonylbenzene, decylbenzene, undecylbenzene, dodecylbenzene, tridecylbenzene, and tetradecylbenzene; hydrocarbon halides such as methylene chloride, chloroform, carbon tetrachloride, and 1,2-dichloroethane; carboxylates; and various oils. These can be used alone or in combination and may contain surfactants.

The electrophoretic particles 5 include organic or inorganic particles (polymer or colloid) which electrophoretically migrate in a dispersion medium in response to a potential difference.

The electrophoretic particles 5 may comprise a black pigment such as aniline black and carbon black; a white pigment such as titanium dioxide, hydrozincite, and antimony trioxide; a yellow pigment such as isoindolinone, chrome yellow, yellow oxide, cadmium yellow, titanium yellow, and antimony; an azo pigment such as mono azo, disazo, and polyazo; a red pigment such as quinacridone red and chrome vermilion red; a blue pigment such as phthalocyanine blue, indanthrene blue, an anthraquinone dye, prussian blue, ultramarine blue, and cobalt blue; or a green pigment such as phthalocyanine green. These can be used alone or in combination.

These pigments can further contain a charge-controlling agent containing an electrolyte, a surfactant, metal soap, a resin, gum, oil, varnish, and compound particles; a dispersant such as a titanium-coupling agent, an aluminum-coupling agent, and a silane-coupling agent; a lubricant; a stabilizing agent; and the like, as required.

In the first embodiment, a drive voltage generator 30 for generating a drive voltage is connected to the electrode 3 and the transparent electrode 4, as described below.

The operation of the first embodiment having the above configuration will now be described.

In the following description, it is described that the electrophoretic particles are negatively charged. However, when the electrophoretic particles are positively charged, substantially the same description is possible except for the direction of the migration.

FIG. 1(b) is a diagram showing an electrical equivalent circuit of the electrophoretic display device 20A according to the first embodiment. In the figure, R and C represent the electrical resistance and the capacitance of the insulating film 11, respectively, and Rep and Cep represent the electrical resistance and the capacitance of the electrophoretic dispersion liquid 10, respectively.

In such a configuration, R and C preferably have a sufficiently large value. The reasons for this are as follows: when R has a small value, a leakage current increases to cause an increase in current consumption and the deterioration of the dispersion liquid; and when C has a small value, the intensity of the voltage applied to the dispersion liquid is decreased so that the response becomes slow. Accordingly, each parameter is adjusted (set) such that the relationship R·C>Rep·Cep is satisfied.

The following situation is herein assumed: the drive voltage generator 30 generates a pulse drive voltage Vin having a pulse width of T and a voltage of Vin to apply the pulse drive voltage to the electrodes 3 and 4. In this case, according to the equivalent circuit shown in FIG. 1(b), a voltage Vep applied to the electrophoretic dispersion liquid 10 is determined using the following formula (1):

$$Vep(t) = \begin{cases} \left[A\exp(-Bt) + \dfrac{Rep}{R+Rep}\right] \cdot Vin & (0 \le t \le T) \\ [A\exp(-Bt)] \cdot [1 - \exp(-BT)] \cdot Vin & (t > T) \end{cases} \quad (1)$$

A and B in formula (1) are expressed by the following formulas (2) and (3), respectively.

$$A = \dfrac{RC - RepCep}{(R+Rep)(C+Cep)} \quad (2)$$

$$B = \dfrac{R+Rep}{RRep(C+Cep)} \quad (3)$$

Thus, when R·C>Rep·Cep, that is, when the time constant (R×C) of the insulating film 11 is larger than the time constant (Rep×Cep) of the electrophoretic dispersion liquid 10, the waveform of the voltage Vep applied to the electrophoretic dispersion liquid 10 is differential. For example, as shown in FIG. 2(a), when the drive voltage Vin has a rectangular waveform, the voltage Vep applied to the electrophoretic dispersion liquid 10 has overshooting and undershooting portions in the waveform at the voltage-applying (rising) part and the voltage-interrupting (falling) part, respectively. Particularly, at the voltage-interrupting part (when t=T), a voltage having a polarity opposite to the drive voltage Vin is applied to the electrophoretic dispersion liquid 10, thus causing self-deletion so that the image-retention characteristics are seriously degraded.

Therefore, in order to solve the above problem, the drive voltage generator 30 generates a drive voltage Vin having a smooth waveform, as shown in FIG. 2(b), which gradually falls with a time constant T after the voltage is interrupted, so that a voltage having polarity opposite to the drive voltage Vin is not applied to the electrophoretic dispersion liquid 10.

The drive voltage Vin is expressed by the following formula (4):

$$Vin(t) = \begin{cases} Vin & (0 \le t \le T) \\ Vin\exp(-(t-T)/\tau) & (t > T) \end{cases} \quad (4)$$

When the drive voltage Vin (t) expressed by formula (4) is applied between the electrodes 3 and 4, the voltage Vep applied to the electrophoretic dispersion liquid 10 is the same as Vin (t) in formula (1) when $0 \le t \le T$ and is expressed by the following formula (5) when t>T.

$$Vep(t) = A\exp(-Bt) + \quad (5)$$
$$\dfrac{Rep(\tau - RC)}{D}\exp(-(t-T)/t + \dfrac{RRep(RC - RepCep)}{(R+Rep)D}\exp(-B(t-T))$$

A, B and D in formula (5) are expressed by the following formulas (6) to (8), respectively.

$$A = \dfrac{RC - RepCep}{(R+Rep)(C+Cep)} \quad (6)$$

$$B = \dfrac{R+Rep}{RRep(C+Cep)} \quad (7)$$

$$D = (R+Rep)\tau - RRep(C+Cep) \quad (8)$$

According to formula (5), when τ>RC>Rep·Cep, the coefficients of all the terms in formula (5) are positive and a voltage opposite to the applied voltage Vep is therefore not produced. In the first embodiment, the drive voltage generated by the drive voltage generator 30 has a waveform changing with a time constant larger than the time constant of the insulating film 11, which includes an insulating member, after the voltage is interrupted.

For example, FIG. 3 shows an example of a drive voltage Vin having a smooth waveform after the voltage is interrupted. The horizontal axis shows time (seconds) and the vertical axis shows voltage (V). The time constant τ is generally defined as follows: τ=0.632 Vin.

Thus, according to the first embodiment, when the time constant (R×C) of the insulating film 11 is larger than the time constant (Rep×Cep) of the electrophoretic dispersion liquid 10, a reverse-polarity voltage is not applied to the electrophoretic dispersion liquid 10, that is, self deletion is prevented. Therefore, the image-retention characteristics are greatly improved.

In the above description, it is mentioned that the drive voltage generated by the drive voltage generator 30 has a positive polarity. When the drive voltage has a negative polarity, substantially the same description is possible except for the sign of the polarity.

It is clear that the above description is applicable to not only the partial waveform of the drive voltage after the interruption of the voltage but also the entire waveform of the drive voltage. As shown in FIG. 4, when the drive voltage has a plurality of different values, for example, a first value V1, a second value V2, a third value V3, and so on, the drive voltage is designed to have a waveform that changes with a time constant larger than the time constant of the insulating film 11, which includes the insulating member, over a period of time during the change of the drive voltage (V1 to V2, V2 to V3, and so on). Therefore, the reverse polarity, which is not preferable, is prevented over the entire waveform of the drive voltage.

Second Embodiment

FIG. 5 is a sectional view showing the configuration of a second embodiment in which an electrophoretic display device includes an electrophoretic device according to the present invention.

As shown in FIG. 5, in the electrophoretic display device 20B according to the second embodiment, microcapsules 40 contain the electrophoretic dispersion liquid 10, and the microcapsules 40 and a binder 41 form a microcapsule layer placed between the electrode 3 integrated with the substrate 1 and the electrode 4 integrated with the second substrate 2. Since the encapsulated electrophoretic dispersion liquid 10 is used, the electrophoretic dispersion liquid 10 can be readily handled so that the manufacturing process can be simplified.

In the second embodiment, the drive voltage generator 30, which is not shown in this figure but is shown in FIG. 1(a), is connected to the electrodes 3 and 4.

Flexible materials such as gum arabic-gelatin compounds and urethane compounds are preferably used for the microcapsules 40. In order to achieve excellent display performance, the microcapsules 40 preferably have substantially the same size. Such microcapsules having substantially the same size can be obtained by filtration, gravity separation, or the like. The microcapsules 40 usually have a size of approximately 30 to 100 µm.

The microcapsule layer can be formed by the following procedure: the microcapsules 40 are mixed into a binder resin, together with a dielectric constant-adjusting agent, if desired, and the resulting resin composition (emulsion or organic solvent solution) is coated on a base material by a known method such as a roller coating method, a roller laminating method, a screen-printing method, a spraying method, or an ink-jet method.

Binder resins having good affinity to the microcapsules 40, good adhesiveness to the base material, and good insulation can be used, and the type is not particularly limited.

Such binder resins include, for example, thermoplastic resins such as polyethylene, chlorinated polyethylene, an ethylene-vinyl acetate copolymer, an ethylene-ethyl acrylate copolymer, polypropylene, an ABS resin, a methyl methacrylate resin, a vinyl chloride resin, a vinyl chloride-vinyl acetate copolymer, a vinyl chloride-vinylidene chloride copolymer, a vinyl chloride-acrylic ester copolymer, a vinyl chloride-methacrylate copolymer, a vinyl chloride-acrylonitrile copolymer, an ethylene-vinyl alcohol-vinyl chloride copolymer, a polypropylene-vinyl chloride copolymer, a vinylidene chloride resin, a vinyl acetate resin, polyvinyl alcohol, polyvinyl formal, and a cellulose resin; polymers such as a polyamide resin, polyacetal, polycarbonate, polyethylene terephthalate, polybuthylene terephthalate, polyphenylene oxide, polysulfone, polyamidoimide, polyaminobismaleimide, polyethersulfone, polyphenylenesulfone, polyarylate, graft polyphenylene ether, polyetherether ketone, and polyetherimide; fluorocarbon resins such as polytetrafluoroethylene, a fluorinated ethylene-propylene copolymer, a tetrafluoroethylene-perfluoroalkoxyethylene copolymer, an ethylene-tetrafluoroethylene copolymer, polyfluorovinylidene, polytrifluorochloroethylene, and fluorocarbon rubber; silicon-containing resins such as a silicone resin and silicone rubber; and other polymers such as a methacrylate-styrene copolymer, polybutylene, and methyl methacrylate-butadiene-styrene copolymer.

For a binder material, the dielectric constant of an electrophoretic display solution preferably is substantially the same as that of a dispersant. The above binder resin composition preferably further contains alcohols, ketones, and carboxylates. Such alcohols include 1,2-butanediol, 1,4-butanediol, and the like.

FIGS. 6 and 7 show the configuration of an electrophoretic display device according to the present embodiment in a more detailed manner. The electrophoretic display device of the present embodiment is an active matrix type. FIG. 6 is a plan view of the electrophoretic display device and FIG. 7 is a sectional view taken along the line A–A' of FIG. 6.

The electrophoretic device 20B shown in the figures includes a first substrate 1, a second substrate 2, and an electrophoretic layer (electro-optical layer) 21 disposed therebetween, wherein the first and second substrates 1 and 2 face each other. A common electrode 4 and an insulating film 11 are disposed on the inner surface (the side of the electrophoretic layer 21) of the second substrate 2 in that order. An electronic element portion 27 having a plurality of pixel electrodes 3 and the like is disposed on the inner surface (the side of the electrophoretic layer 21) of the first substrate 1. In the side of the second substrate 2, the second substrate 2, the common electrode 4, and the insulating film 11 have optical transparency. The outer surface of the second substrate 2 functions as a display surface of the electrohoretic device 20B. The first substrate 1 having the element portion 27 may further include various peripheral circuits, not shown, for controlling the operation of the element portion 27. In this embodiment, the common electrode 4 is disposed at the side of the second substrate 2 and the element portion 27 is disposed at the side of the first substrate 1. However, the element portion 27 may be disposed at the side of the second substrate 2.

The second substrate 2 may comprise, for example, a transparent material such as a transparent glass or a transparent film. The first substrate 1 does not need to be transparent and may comprise, for example, glass or a resin film.

As shown in FIG. 7, the electrophoretic layer 21 includes the microcapsules 40 containing the dispersion medium 6 and the plurality of electrophoretic particles 5 dispersed therein.

The dispersion medium 6 includes water; alcohol solvents such as methanol, ethanol, isopropanol, butanol, octanol, and methyl cellosolve; various esters such as ethyl acetate and butyl acetate; ketones such as acetone, methyl ethyl ketone, and methyl isobutyl ketone; aliphatic hydrocarbons such as pentane, hexane, and octane; alicyclic hydrocarbons such as cyclohexane and methyl cyclohexane; aromatic hydrocarbons including long-chain alkylbenzenes such as benzene, toluene, xylene, hexylbenzene, heptylbenzene, octylbenzene, nonylbenzene, decylbenzene, undecylbenzene, dodecylbenzene, tridecylbenzene, and tetradecylbenzene; halogenated hydrocarbons such as methylene chloride, chloroform, carbon tetrachloride, and 1,2-dichloroethane; carboxylates; and various oils. These can be used alone or in combination and may further contain surfactants.

The electrophoretic particles 5 are organic or inorganic particles (polymer or colloid) which electrophoretically migrate in a dispersion medium in response to a potential difference. The electrophoretic particles 5 include, for example, white pigments such as titanium dioxide, hydrozincite, and antimony trioxide, which can be used alone or in combination and may contain surfactants. These pigments can further contain a charge-controlling agent containing an electrolyte, a surfactant, metal soap, a resin, gum, oil, varnish, and compound particles; a dispersant such as a titanium-coupling agent, an aluminum-coupling agent, and a silane-coupling agent; a lubricant; a stabilizing agent; and the like according to needs.

The combination of the dispersion medium 6 and the electrophoretic particles 5 is not particularly limited. However, it is preferable that the dispersion medium 6 is designed to have substantially the same specific gravity as that of the electrophoretic particles 5 in order to avoid the precipitation of the electrophoretic particles 5 caused by gravitation.

FIG. 6 is a plan view showing the configuration of the image display region of the electrophoretic display device 20B according to the present embodiment, wherein the image display region includes a plurality of pixel portions 17 (pixel electrodes 3 and TFT elements 13) arranged in a matrix, data lines 16, scanning lines 14, and the like. In the electrophoretic display device 20B of this embodiment, the image display region includes a plurality of display units arranged in a matrix, each having one of the pixel electrodes 3 functioning as a transparent conductive layer and one of the TFT elements 13 for controlling the supply of current to the pixel electrode 3, and the data lines 16 for receiving image signals are electrically connected to the sources of the TFT elements 13. Image signals written on the data lines 16 are supplied line-sequentially or are supplied to the plurality of data lines 16 adjacent to one another in a group.

As shown in FIG. 7, each of the scanning lines 14 is electrically connected to the gate of each TFT element 13, so that scanning signals are line-sequentially supplied to the plurality of scanning lines 14 intermittently at a predetermined timing. The pixel electrode 3 is electrically connected to the drain electrode 19 of the TFT element 13, so that image signals supplied from each data line 16 are written at a predetermined timing by only turning on each TFT element 13 for a predetermined period. The image signals, having a predetermined level, written to the pixel electrode 3 are held between the common electrode 4 and the pixel electrode 3 for a given period. Electrically charged particles 5 are attracted to either the pixel electrode 3 or the common electrode 4, whichever one has a polarity opposite to that of the charged particles, so that a grayscale can be displayed using the contrast between the color of the charged particles and the color of the dispersion medium.

As shown in FIG. 6, the plurality of pixel electrodes 3 are arranged in a matrix on the first substrate 1, and the data lines 16 and the scanning lines 14 extend along vertical and horizontal boundaries of the pixel electrodes 3. In this embodiment, each of the display units (dots) is the display region provided in an area surrounded by each of the data lines 16 and each of the scanning lines 14, so that it is possible to control the individual display units, which are arranged in a matrix.

The drive voltage generator 30 (drive circuit) of the electrophoretic display unit 20B according to the present embodiment will now be described.

The drive voltage generator 30 of the present embodiment includes a voltage-generating circuit 31, a selection circuit 32, and a wave-shaping circuit 33. In this embodiment, the voltage-generating circuit 31 has a function of generating a signal voltage having three different values and includes resistance-divider portions 31a, operational amplifiers 31b, and capacitors 31c. The selection circuit 32 has a function of selecting any one of the different values of the signal voltage generated in the voltage-generating circuit 31 and includes semiconductor analog switches controlled by a CPU (not shown) and the like. The wave-shaping circuit 33 has a function of smoothing the waveform of the signal voltage selected by the selection circuit 32 when the signal voltage is changing, and includes a resistor 33r, a capacitor 33c, and an operational amplifier 33a.

In the drive voltage generator 30 having the above configuration, the voltage-generating circuit 31 generates a signal voltage having three values, for example, 0 V, −15 V, and +15 V, and the selection circuit 32 selects any one of the three values of the signal voltage. The signal voltage output from the selection circuit 32 has a rectangular waveform, which is not smoothed, as indicated by A. The waveform of the signal voltage is then shaped by the wave-shaping circuit 33 so that the waveform is converted from a rectangular form to a smooth form when the voltage (at the rising portion and the falling portion) changes after the signal voltage is output from the wave-shaping circuit 33.

FIG. 9 is a timing chart for illustrating the operation of the electrophoretic display unit 20B according to the present embodiment. For one display unit (dot), a signal voltage G1 for keeping each TFT element 13 turned on for a predetermined period (1 H period) is supplied to each scanning lime 14 for each frame. Another signal voltage V1 output from the drive voltage generator 30 having the above configuration is supplied to each data line 16, wherein the signal voltage V1 has a smooth waveform when the voltage changes. On the other hand, a constant voltage V2 (for example, a ground potential) is supplied to the common electrode 4. Thus, a differential potential (V1−V2) between the signal voltage V1 and the constant voltage V2 is applied to the electrophoretic layer 21 disposed between the pixel electrode 3 and the common electrode 4 for a period of 1 H.

In the second embodiment, as shown in FIG. 7, a wall film 40a of each microcapsule 40, the binder 41, and the insulating film 11 each work (function) as an insulating member. Thus, the time constant of the insulating member may be determined on the basis of the combination of the time constants and the contents of the microcapsule wall film 40a, the binder 41, and the insulating film 11. In this embodiment, a reverse-polarity voltage is not applied to the electrophoretic dispersion liquid 10, thereby preventing self-deletion and greatly improving the image-retention characteristics. Such advantages are the same as those of the first embodiment.

In this embodiment, when at least one of the wall film 40a of each microcapsule 40 and the binder 41 has insulating performance sufficient to prevent the deterioration of the dispersion liquid caused by charge transfer between the electrophoretic dispersion liquid and the electrodes, the insulating film 11 can be omitted. In this case, the wall film 40a of each microcapsule 40 and the binder 41 each work (function) as an insulating member. Thus, the time constant of the insulating member can be determined on the basis of the combination of the time constants and the contents of the microcapsule wall film 40a and the binder 41.

The configuration of an electronic book, which is an embodiment of an electronic device according to the present invention, will now be described with reference to FIG. 11.

The electronic book 61 displays data of electronically published books on a screen of a display including the electrophoretic display device described above, wherein the data is stored in memory media such as CD-ROMs.

As shown in FIG. 11, the electronic book 61 includes a book-shaped frame 62 and an opening/closing cover 63 connected to the frame 62. The frame 62 has a display 64, whose screen is exposed, and a control means 65 thereon.

As shown in FIG. 12, the frame 62 houses a controller 66, a counter 67, a memory 68, a data-reading device (not shown) for reading the data of memory media such as CD-ROMs, and the like.

In this instance, the display 64 includes a pixel portion 69 having substantially the same configuration as the electrophoretic display device 20A shown in FIG. 1 and peripheral circuits 70 that are incorporated and integrated with the pixel portion 69. The peripheral circuits 70 have scan drivers and data drivers using a decoding method.

An electronic device of the present invention includes the display 64 having an electrophoretic display device and is not limited to the electronic book of the above-mentioned embodiment. Other examples of electronic devices including the display 64 will now be described.

Mobile Computer

First, an example of a mobile personal computer including the above-mentioned display 64 will now be described. FIG. 13 is a perspective view showing the configuration of the personal computer. As shown in FIG. 13, the personal computer 80 includes a main body 82 having a keyboard 81 and a display unit having the above-mentioned display 64.

Mobile Phone

Next, an example of a mobile phone having a display portion including the above-mentioned display 64 will now be described. FIG. 14 is a perspective view showing the configuration of the mobile phone. As shown in FIG. 14, the mobile phone 90 includes a plurality of operating buttons 91, a receiver 92, a transmitter 93, and the above-mentioned display 64.

Digital Still Camera

Furthermore, an example of a digital still camera having a finder including the above-mentioned display 64 will now be described. FIG. 15 is a perspective view showing the configuration of the digital still camera and also schematically showing external devices connected thereto.

Ordinary cameras capture the optical image of a subject by exposing a film. In contrast, the digital still camera 100 photoelectrically converts the optical image of a subject into image signals with an imager such as a CCD (Charge Coupled Device).

In the digital still camera 100, the above-mentioned display 64 is placed on the back of a case 101 and displays an image according to the image signals from the CCD. Thus, the display 64 functions as a finder for displaying a subject. In the front (the rear side in the figure) of the case 101, an optical lens, a light-receiving unit 102 including the CCD, and the like are arranged.

When a user checks the image of a subject displayed on the display 64 and then pushes a shutter button 103, the image signals at that point in time are transmitted from the CCD to the memory on a circuit substrate 104 and are stored in the memory.

In the digital still camera 100, a video signal output terminal 105 and an input-output terminal 106 for communicating data are placed on the side face of the case 101. As shown in the figure, a TV monitor 108 is connected to the video signal output terminal 105, which is the former, and a personal computer 108 is connected to the input-output terminal 106 for communicating data, which is the latter, as required. Furthermore, when predetermined operation is performed, the image signals stored in the memory on the circuit substrate 104 are output to the TV monitor 107 or the personal computer 108.

Electronic Paper

Furthermore, an example of electronic paper having a display portion including the above-mentioned display 64 will now be described. FIG. 16 is a perspective view showing the configuration of the electronic paper. The electronic paper 110 comprises a main body 111 including a rewritable sheet having the same texture and flexibility as that of paper and a display unit including the above-mentioned display 64.

Electronic Notebook

FIG. 17 is a perspective view showing the configuration of an electronic notebook. As shown in FIG. 17, the electronic notebook 120 has a cover 121 and a plurality of sheets of the electronic paper 110 shown in FIG. 16 bound by the cover 121. Since the cover 121 includes a display data input means, the display content can be changed while the plurality of sheets of electronic paper are bound.

In each of the above-mentioned embodiments of electronic devices according to the present invention, the display 64 includes the electrophoretic display device shown in FIG. 1. Therefore, in displays including an electrophoretic display, the image-retention characteristics can be greatly improved. Particularly, such an improvement is preferable for electronic paper because of the need to hold the display content for a long time.

Apart from the electronic book shown in FIG. 11, the personal computer shown in FIG. 13, the mobile phone shown in FIG. 14, the digital still camera shown in FIG. 15, and the electronic paper shown in FIG. 16, the above electronic device includes a liquid crystal TV, a viewfinder-type or direct-monitoring-type video tape recorder, a car navigation system, a pager, an electronic notebook, an electronic calculator, a word processor, a workstation, a video phone, a POS terminal, a device including a touch panel, and the like. The above-mentioned display can be used for a display portion of each of these electronic devices as a matter of course.

EXAMPLE

An electrophoretic device of the present invention will now be described in more detail with reference to a particular example. Since a general electrophoretic dispersion liquid has a resistance Rep of 1 GΩ and a capacitance Cep of 45 pF, the time constant (per cm$^2$) τep of the electrophoretic dispersion liquid is obtained as follows:

$$\tau ep = Rep \times Cep = 45 \text{ millisecond.}$$

An insulating film preferably has a time constant sufficiently larger than that of the electrophoretic dispersion liquid, that is, for example, a time constant that is ten times larger.

In this case, the time constant τ of the insulating film is obtained as follows:

$$\tau = 10 \times \tau ep = 450 \text{ millisecond.}$$

When the insulating film comprises a material whose volume resistance is ρ (Ω·cm) and whose relative dielectric constant is ∈r, the following relationship is satisfied (the particular calculation procedure is omitted):

$$\rho \cdot \in r = 5.2 \times 10^{12}.$$

A material having substantially the same values as those of ρ and ∈r includes, for example, a thermoplastic polyurethane resin (ρ=10$^{11}$–10$^{12}$ and ∈r=5.5–6, Polymer Data Handbook, The Society of Polymer Science, Japan).

A plurality of materials may be mixed to adjust one or both of the values of ρ and ∈r to an appropriate value or values. For example, the following method is known: an alcohol, ketone, or carboxylate is mixed into a water soluble resin such as an acrylic, ester, or urethane resin to adjust the dielectric constant.

The time constant τv of the applied voltage Vin is two times larger than the time constant τ of the insulating film as follows:

τv=2×τ=900 millisecond.

Accordingly, for example, in the drive voltage-generating circuit 30 shown in FIG. 8, the following conditions are satisfied:

Rc=100 MΩ and Cc=9 nF wherein Rc represents the electrical resistance of the resistor 33r and Cc represents the capacitance of the capacitor 33c.

Advantages

As described above, the present invention provides an electrophoretic device having first and second electrodes, an electrophoretic dispersion liquid containing at least a liquid dispersion medium and electrophoretic particles, and a member comprising an insulating material, wherein at least one of the first and second electrodes comprises a transparent material, and the electrophoretic dispersion liquid and the member are placed between the first and second electrodes. The electrophoretic device includes a drive voltage-generating means for generating a drive voltage applied between the first and second electrodes, wherein the voltage generated by the drive voltage-generating means has a waveform that changes with a time constant larger than the time constant of the insulating member when the voltage changes. Thus, according to the present invention, the electrophoretic dispersion liquid is prevented from deteriorating and the image-retention characteristics are greatly improved.

Furthermore, in an electronic device according to the present invention, a display includes an electrophoretic display device having an electrophoretic device. Thus, according to the electronic device of the present invention, a display including an electrophoretic display device and having greatly improved image-retention characteristics can be obtained.

What is claimed is:

1. A electrophoretic device comprising:
   a first substrate;
   a first electrode disposed on the first substrate;
   a second substrate;
   a second electrode disposed on the second substrate and facing the first electrode;
   an electro-optical layer having an electrophoretic dispersion liquid containing at least a dispersion medium and electrophoretic particles and located between the first and second electrodes; and
   an insulating member disposed between the first and second electrodes,
   wherein a voltage applied between the first and second electrodes has different values, and a time constant of the voltage is larger than a time constant of the insulating member when the voltage changes from one of the different values to another.

2. The electrophoretic device according to claim 1, wherein the insulating member is disposed between at least one of the group including the first electrode and the electro-optical layer, and the second electrode and the electro-optical layer.

3. The electrophoretic device according to claim 1, wherein the first substrate and the first electrode both have optical transparency, and the insulating member is disposed between the first electrode and the electro-optical layer and has optical transparency.

4. The electrophoretic device according to claim 1, wherein the following relationship is satisfied:

R×C≧Rep×Cep wherein R represents the electrical resistance of the insulating member, C represents the capacitance of the insulating member, Rep represents the electrical resistance of the electrophoretic dispersion liquid, and Cep represents the capacitance of the electrophoretic dispersion liquid.

5. The electrophoretic device according to claim 1, wherein the insulating member includes an insulating film disposed on at least one of the first substrate and the second substrate.

6. The electrophoretic device according to claim 1, wherein the electro-optical layer includes a plurality of capsules containing the electrophoretic dispersion liquid, and
the insulating member includes the wall film of the capsules.

7. The electrophoretic device according to claim 6, wherein the electro-optical layer further includes a binder disposed at least either between the first electrode and the capsules or between the second electrode and the capsules, and
the insulating member includes the binder.

8. The electrophoretic device according to claim 1, wherein the waveform of a voltage applied between the first electrode and the second electrode changes with a time constant larger than the time constant of the insulating member after the voltage is interrupted.

9. A method for driving an electrophoretic device having a first electrode, a second electrode facing the first electrode, an electro-optical layer having an electrophoretic dispersion liquid containing at least a dispersion medium and electrophoretic particles and located between the first and second electrodes, and an insulating member disposed between the first and second electrodes, the method comprising:
   applying a signal voltage between the first and second electrodes, wherein the signal voltage has different values and has a smooth waveform when the signal voltage changes from one of the different values to another.

10. The method for driving an electrophoretic device according to claim 9,
wherein a time constant of the signal voltage is larger than a time constant of the insulating member when the signal voltage changes from one of the different values to another.

11. The method for driving an electrophoretic device according to claim 9,
wherein the waveform of the voltage applied between the first and second electrodes is smoothed with a time constant larger than the time constant of the insulating member after the voltage is interrupted.

12. A circuit for driving an electrophoretic device having a first electrode, a second electrode facing the first electrode, an electro-optical layer having an electrophoretic dispersion liquid containing at least a dispersion medium and electrophoretic particles and located between the first and second electrodes, and an insulating member disposed between the first and second electrodes, the circuit comprising:

a voltage-generating circuit for generating a signal voltage having a plurality of different values;

a selection circuit for selecting any one of the different values of the signal voltage generated in the voltage-generating circuit; and a waveform-shaping circuit for smoothing the waveform of a signal voltage output from the selection circuit when the signal voltage changes.

13. An electronic device having a display for displaying data, wherein the display includes an electrophoretic display device having an electrophoretic device according to claim 1.

* * * * *

UNITED STATES PATENT AND TRADEMARK OFFICE
CERTIFICATE OF CORRECTION

PATENT NO. : 6,671,081 B2
DATED : December 30, 2003
INVENTOR(S) : Hideyuki Kawai It is certified that error appears in the above-identified patent and that said Letters Patent is hereby corrected as shown below:

<u>Title page,</u>
Item [75], Inventors, should be -- Hideyuki Kawai, Fujimi (JP) --
Item [57], ABSTRACT,
Line 4, delete "a" and substitute -- an -- therefor <u>Column 6,</u>
Line 10, after "surface" insert -- of --

<u>Column 7,</u>
Line 65, "T" should be -- τ --

<u>Column 12,</u>
Lines 21-22, delete "lime 14" and substitute -- line 14 -- therefor <u>Column 15,</u>
Line 41, delete "A" and substitute -- An -- therefor Signed and Sealed this Twenty-fifth Day of May, 2004

JON W. DUDAS
*Acting Director of the United States Patent and Trademark Office*